(12) United States Patent
Wang et al.

(10) Patent No.: US 10,439,177 B2
(45) Date of Patent: Oct. 8, 2019

(54) PORTABLE ELECTRONIC DEVICE AND JOINING MECHANISM THEREOF

(71) Applicant: Quanta Computer Inc., Taoyuan (TW)

(72) Inventors: Chin-Wen Wang, Taoyuan (TW); Chih-Kai Hsu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 121 days.

(21) Appl. No.: 15/684,200

(22) Filed: Aug. 23, 2017

(65) Prior Publication Data

US 2018/0287114 A1    Oct. 4, 2018

(30) Foreign Application Priority Data

Mar. 30, 2017    (TW) .............................. 106110734 A

(51) Int. Cl.
| | |
|---|---|
| *H01M 2/10* | (2006.01) |
| *H01M 2/02* | (2006.01) |
| *H01M 2/04* | (2006.01) |
| *G06F 1/16* | (2006.01) |
| *H02J 7/00* | (2006.01) |

(52) U.S. Cl.
CPC ........ *H01M 2/1022* (2013.01); *G06F 1/1635* (2013.01); *H01M 2/0202* (2013.01); *H01M 2/0404* (2013.01); *H01M 2/1066* (2013.01); *H02J 7/0044* (2013.01); *H02J 7/0045* (2013.01); *G06F 1/163* (2013.01); *H01M 2220/30* (2013.01)

(58) Field of Classification Search
CPC .......................... H01M 2/1022; H01M 2/1016
See application file for complete search history.

(56) References Cited

U.S. PATENT DOCUMENTS

2010/0136425 A1* 6/2010 Gau ...................... B60L 11/007
429/187

* cited by examiner

*Primary Examiner* — Olatunji A Godo
(74) *Attorney, Agent, or Firm* — McClure, Qualey & Rodack, LLP

(57) ABSTRACT

A joining mechanism includes a main body and a positioning assembly. The positioning assembly includes a first positioning member, a second positioning member, a first resilient member and a second resilient member. The first and second positioning members are pivotally connected to the main body. When a first battery and a second battery are installed in the main body, the first and second batteries respectively push the first and second positioning members from a first initial position and a second initial position to a first release position and a second release position. When the first battery is removed, the second resilient member forces the second positioning member to rotate from the second release position to the second initial position and to join with the second battery.

20 Claims, 10 Drawing Sheets

PORTABLE ELECTRONIC DEVICE AND JOINING MECHANISM THEREOF

CROSS REFERENCE TO RELATED APPLICATIONS

This application claims the benefit of Taiwan Patent Application No. 106110734, filed Mar. 30, 2017, the entirety of which is incorporated by reference herein.

BACKGROUND OF THE DISCLOSURE

Field of the Disclosure

The present disclosure relates to a portable electronic device and a joining mechanism thereof, and more particularly to a portable electronic device and a joining mechanism having a foolproof design.

Description of the Related Art

In modern society, new products consisting of electronic devices are continuously being developed. These include desktop computers, notebook computers, smartphones, and tablet computers, which have become indispensable parts of modern-day life. With the progress being made in the development of technology, electronic devices with virtual reality functionality have become popular. This kind of electronic device includes a portable electronic device for performing an application and a virtual reality headset connected to the portable electronic device. A user can wear the portable electronic device on his or her back, and wear the virtual reality headset on his or her head, so as to play a virtual reality game.

Because virtual reality games require high-performance central processing units and graphics processors, the power consumption of such portable electronic devices is greater than that of conventional notebook computers. Therefore, a portable electronic device for running virtual reality applications (or games) is configured to include at least two batteries, so as to meet the power requirements.

However, in the procedure of replacing the battery, the user may accidentally remove the two batteries at the same time, resulting in an accidental shutdown of the portable electronic device. Therefore, the user has to reboot the portable electronic device 100, resulting in a waste of time. Consequently, how to prevent the user from accidentally removing two batteries at the same time by way of the structural design of the portable electronic device is an important subject for further research and development.

BRIEF SUMMARY OF THE DISCLOSURE

According to some embodiments of the disclosure, the joining mechanism includes a joining mechanism for fixing a first battery and a second battery. The joining mechanism includes a main body and a positioning assembly. The main body includes a first installation slot and a second installation slot. The positioning assembly includes a first positioning member, a second positioning member, a first resilient member and a second resilient member. The first positioning member is pivotally connected to the main body and is located on a first initial position. The second positioning member is pivotally connected to the main body and is located on a second initial position. The first resilient member is disposed between the first positioning member and the main body, and the second resilient member is disposed between the second positioning member and the main body. When the first and second batteries are installed in the first and second installation slots, the first and second batteries respectively push the first and second positioning members from a first initial position and a second initial position to a first release position and a second release position, so that the first resilient member and the second resilient member are forced to be deformed, and when the first battery is removed from the first installation slot, the second resilient member forces the second positioning member to rotate relative to the main body from the second release position to the second initial position and to be joined with the second battery, so as to constrain the second battery in the second installation slot.

In some embodiments, when the second battery is removed from the second installation slot, the first resilient member forces the first positioning member, so that the first positioning member rotates relative to the main body from the first release position to the first initial position and is joined with the first battery, so as to constrain the first battery in the first installation slot.

In some embodiments, the first battery and the second battery respectively have a first joining slot and a second joining slot, the first positioning member and the second positioning member respectively have a first joining portion and a second joining portion, configured to respectively join with first joining slot and the second joining slot.

In some embodiments, the first positioning member and the second positioning member respectively have a first protruding portion and a second protruding portion, configured to respectively contact the second battery and the first battery.

In some embodiments, the joining mechanism further includes a first constraining structure and a second constraining structure configured to constrain the first battery and the second battery in the first installation slot and the second installation slot. When the first constraining structure is separated from the first battery, the second resilient member drives the second positioning member to rotate from the second release position to the second initial position, so that the second protruding portion pushes the first battery to separate from the main body, and the second joining portion is joined with the second joining slot.

In some embodiments, the first battery and the second battery respectively have a first constraining slot and a second constraining slot, configured to be respectively joined with the first constraining structure and the second constraining structure.

In some embodiments, the first battery and the second battery respectively have a first guiding structure and a second guiding structure, and the first joining portion and the second joining portion respectively have a first inclined surface and a second inclined surface, wherein the first guiding structure contacts the first inclined surface when the first battery is installed in the first installation slot, and the second guiding structure contacts the second inclined surface when the second battery is installed in the second installation slot.

In some embodiments, the first joining portion has a hook structure, the first joining slot has an inclined surface and a bottom surface, and an acute angle is formed between the inclined surface and the bottom surface.

In some embodiments, the joining mechanism further includes a first guiding track and a second guiding track respectively disposed in the first installation slot and the second installation slot, and the first guiding track and the second guiding track are configured to guide the first battery and the second battery to slide into the first installation slot and the second installation slot.

In some embodiments, the first positioning member and the second positioning member are symmetrically disposed on the main body relative to the central axis of the main body.

In some embodiments, the joining mechanism includes two positioning assemblies disposed on opposite sides of the main body.

In some embodiments, the disclosure provides a portable electronic device including a casing, a cover, a first battery, a second battery and the joining mechanism. The cover is connected to the casing, and the joining mechanism is disposed in the casing.

The disclosure provides a portable electronic device and a joining mechanism thereof. The joining mechanism can be used for fixing the first battery and the second battery. When only the first battery is removed, the second resilient member of the joining mechanism provides a resilient force to the second positioning member, so that the second positioning member rotates from the second release position to the second initial position and is joined with the second battery, so as to constrain the second battery in the second installation slot. Conversely, when only the second battery is removed, the first resilient member drives the first positioning member to be joined with the first battery, so as to constrain the first battery in the first installation slot. Therefore, based on the structural design of the joining mechanism of the disclosure, the user can only remove one of the first and second battery, so as to solve the conventional problem that the user accidentally removes two batteries together in the procedure of replacing the battery, resulting in an accidental shutdown of the portable electronic device.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION OF THE ILLUSTRATIVE EMBODIMENTS

Figure 1:
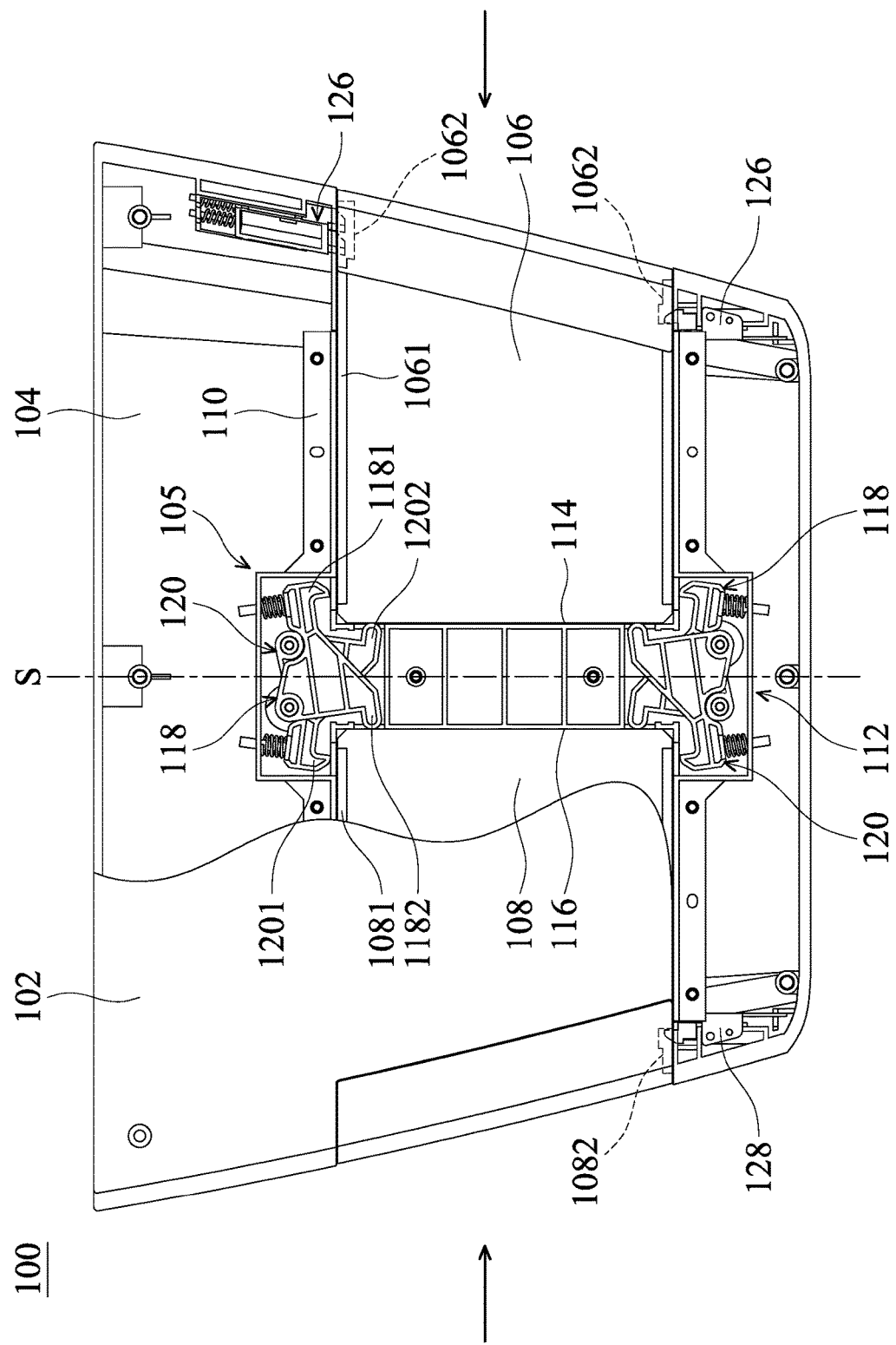
FIG. 1 is a diagram of a portable electronic device according to an embodiment of the disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Please refer to FIG. 1, which is a diagram of a portable electronic device 100 according to an embodiment of the disclosure. The portable electronic device 100 can be a personal digital assistant (PDA), a smartphone, a tablet computer, a mobile phone, a mobile internet device (MID), a notebook computer, a car computer, a gaming device or other kinds of mobile devices. However, it should be understood by the person skilled in the art that the disclosure is not limited to these device. The portable electronic device 100 can include a central processing unit (CPU), a graphics processing unit (GPU), a storage device (such as random access memory, flash memory, read-only memory, erasable programmable read only memory, electrically-erasable programmable read-only memory, a register, a hard disk, a portable hard disk, a compact disc read-only memory, or other storage media readable by other computer in the art), and a battery for providing the portable electronic device 100 with electricity.

In this embodiment, the portable electronic device 100 is a wearable gaming computer or a virtual reality backpack computer, which is worn by a user. In particular, the portable electronic device 100 can be connected to a virtual reality headset through a transmission interface (such as a USB interface or a HDMI interface). The portable electronic device 100 can perform a high-performance application (such as a virtual reality game) and can transmit related data to the virtual reality headset, so that the user can play the virtual reality game. As shown in FIG. 1, the portable electronic device 100 includes a cover 102 (only a part of the cover 102 is shown in FIG. 1), a casing 104 and a joining mechanism 105. The casing 104 is covered by the cover 102, and the joining mechanism 105 is disposed on the casing 104. Two batteries can be installed in the casing 104 (a first battery 106 and a second battery 108). In addition, there are a processor, a graphics processor, a storage device and other components (not shown in the figures) electrically connected to the batteries disposed in the casing 104.

Figure 2:
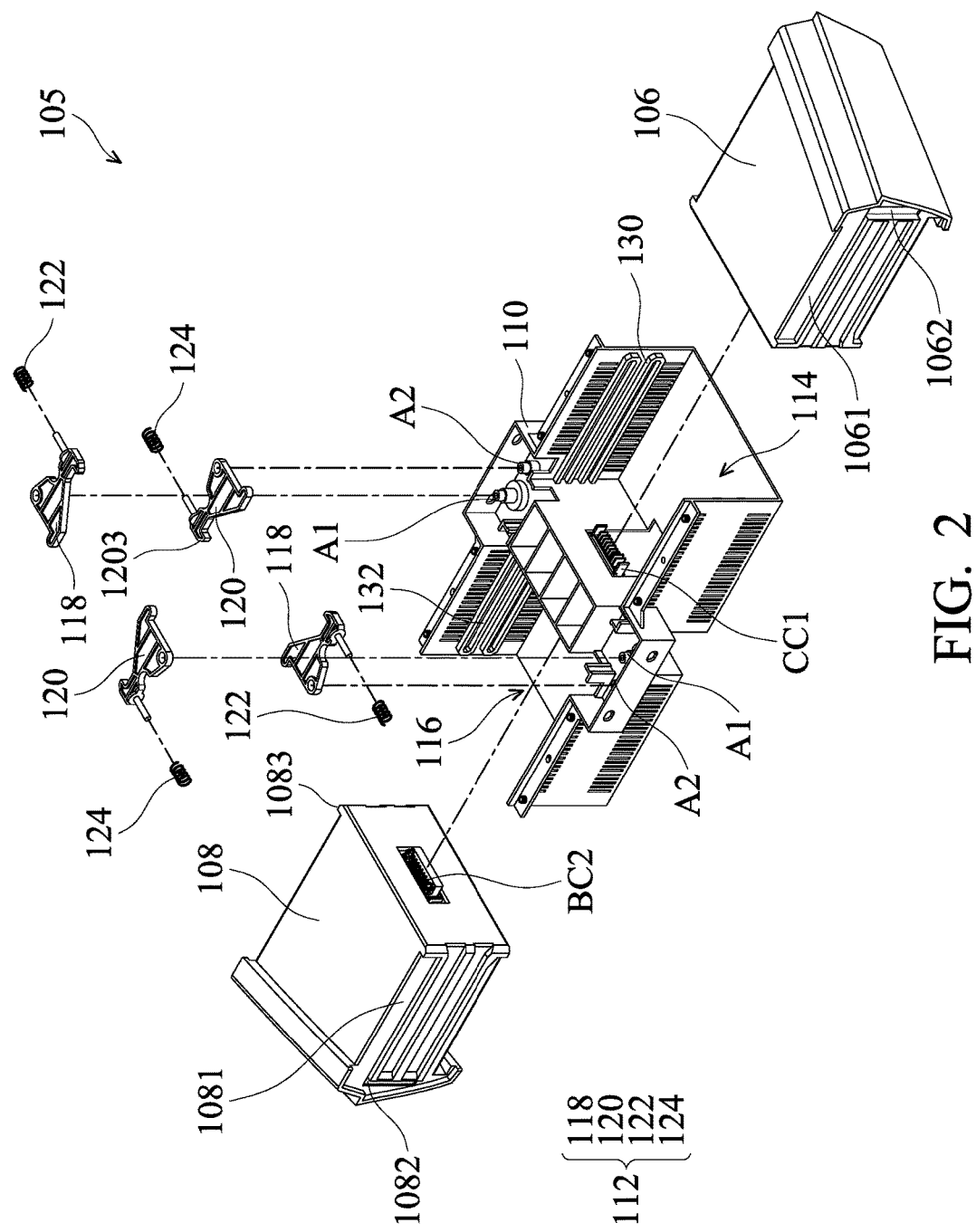
FIG. 2 is an exploded diagram of a joining mechanism according an embodiment of the disclosure.

Please refer to FIG. 1 and FIG. 2. FIG. 2 is an exploded diagram of the joining mechanism 105 according to an embodiment of the disclosure. The joining mechanism 105 is mainly configured to fix a first battery 106 and a second battery 108 to the casing 104. The joining mechanism 105 includes a main body 110 and at least one positioning assembly 112. The main body 110 is disposed on the casing 104 and includes a first installation slot 114 and a second installation slot 116, configured to respectively accommodate the first battery 106 and the second battery 108. As shown in FIG. 1, this embodiment includes two symmetrical positioning assemblies 112 disposed on two opposite sides of the main body 110. For example, the positioning assemblies 112 are respectively disposed on the upper side and the lower side of the first installation slot 114 or the second installation slot 116 as shown in FIG. 1 and FIG. 2.

Each of the positioning assemblies 112 includes a first positioning member 118, a second positioning member 120, a first resilient member 122 and a second resilient member 124. The first positioning member 118 is pivotally connected to the main body 110 and can rotate relative to the main body 110 around a rotating axis A1. The second positioning member 120 is pivotally connected to the main body 110 and can rotate relative to the main body 110 around a rotating axis A2. The first resilient member 122 and the second resilient member 124 can be springs, but it is not limited thereto. The first resilient member 122 contacts the first positioning member 118 and is disposed between the first positioning member 118 and the main body 110. The second resilient member 124 contacts the second positioning member 120 and is disposed between the second positioning member 120 and the main body 110. The first positioning member 118 and the second positioning member 120 are symmetrically disposed on the main body 110 relative to a central axis S of the main body 110 (as shown in FIG. 1). In addition, the first positioning member 118 and the second positioning member 120 are disposed on the main body 110 in a stacking manner. For example, as shown in FIG. 1, the first positioning member 118 is disposed above the second positioning member 120 in this embodiment, but it is not limited to this arrangement.

When the first battery 106 and the second battery 108 are not installed in the first installation slot 114 and the second installation slot 116, the first resilient member 122 and the second resilient member 124 are not be forced and deformed. At this time, the first positioning member 118 is located on a first initial position, and the second positioning member 120 is located on a second initial position. As shown in FIG. 1, the first battery 106 and the second battery 108 respectively have a first joining slot 1061 and a second joining slot 1081. The first positioning member 118 and the second positioning member 120 respectively have a first joining portion 1181 and a second joining portion 1201, which are configured to respectively join with first joining slot 1061 and the second joining slot 1081. In addition, the first positioning member 118 and the second positioning member 120 further respectively have a first protruding portion 1182 and a second protruding portion 1202, which are configured to respectively contact the second battery 108 and the first battery 106. When the first battery 106 and the second battery 108 are inserted into the first installation slot 114 and the second installation slot 116 along the arrow directions in FIG. 1, the first battery 106 and the second battery 108 respectively contact the second protruding portion 1202 and the first protruding portion 1182, so as to drive the first positioning member 118 and the second positioning member 120 to rotate relative to the main body 110.

The joining mechanism 105 can further include a first constraining structure 126 and a second constraining structure 128. As shown in FIG. 1, when the first battery 106 and the second battery 108 are installed in the main body 110, the first constraining structure 126 and the second constraining structure 128 are configured to respectively constrain the first battery 106 and the second battery 108 in the main body 110. The first constraining structure 126 and the second constraining structure 128 can be disposed on the casing 104, but it is not limited thereto. The first constraining structure 126 and the second constraining structure 128 can be latch structures or hook structures for respectively joining with a first constraining slot 1062 of the first battery 106 and a second constraining slot 1082 of the second battery 108.

Furthermore, as shown in FIG. 2, a first guiding track 130 and a second guiding track 132 can be formed on the main body 110 of the joining mechanism 105, and the first guiding track 130 and the second guiding track 132 are respectively located in the first installation slot 114 and the second installation slot 116. The first guiding track 130 and the second guiding track 132 are configured to respectively guide the first battery 106 and the second battery 108 to slide into and to be smoothly installed in the first installation slot 114 and the second installation slot 116.

Figure 3A:
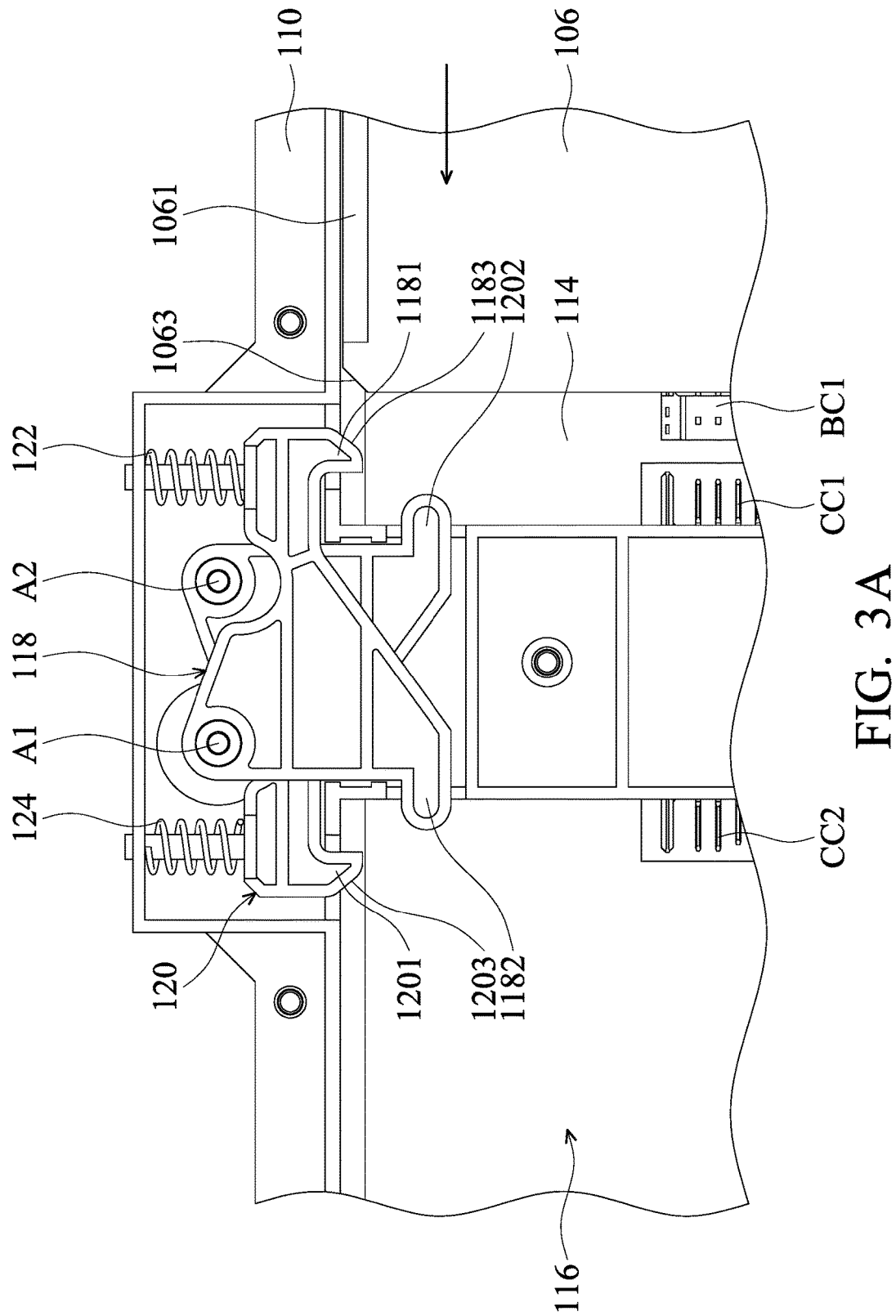
FIG. 3A to FIG. 3D are diagrams illustrating the procedure of installing a first battery in a first installation slot according to an embodiment of the disclosure.
Figure 3B:
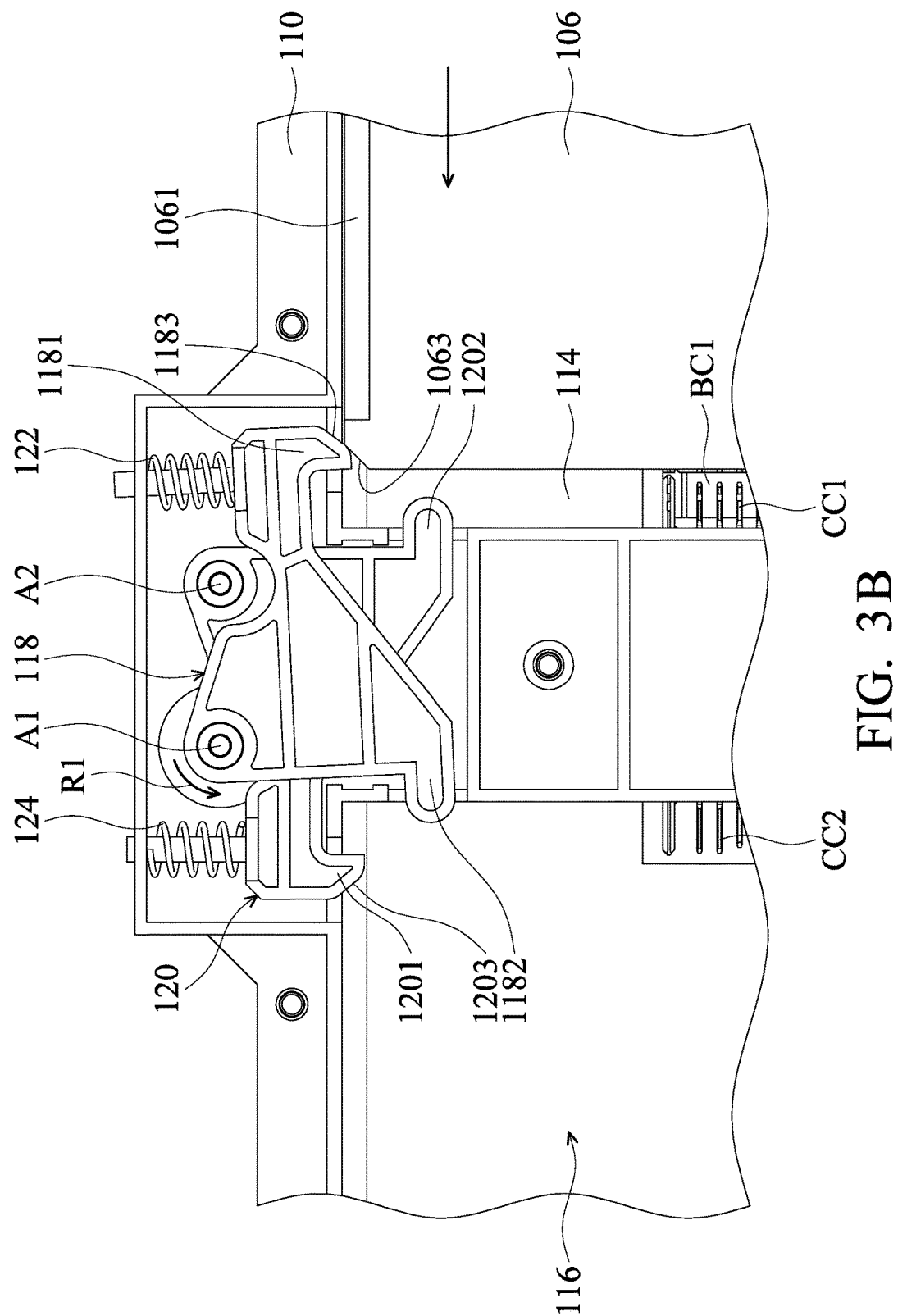
Figure 3C:
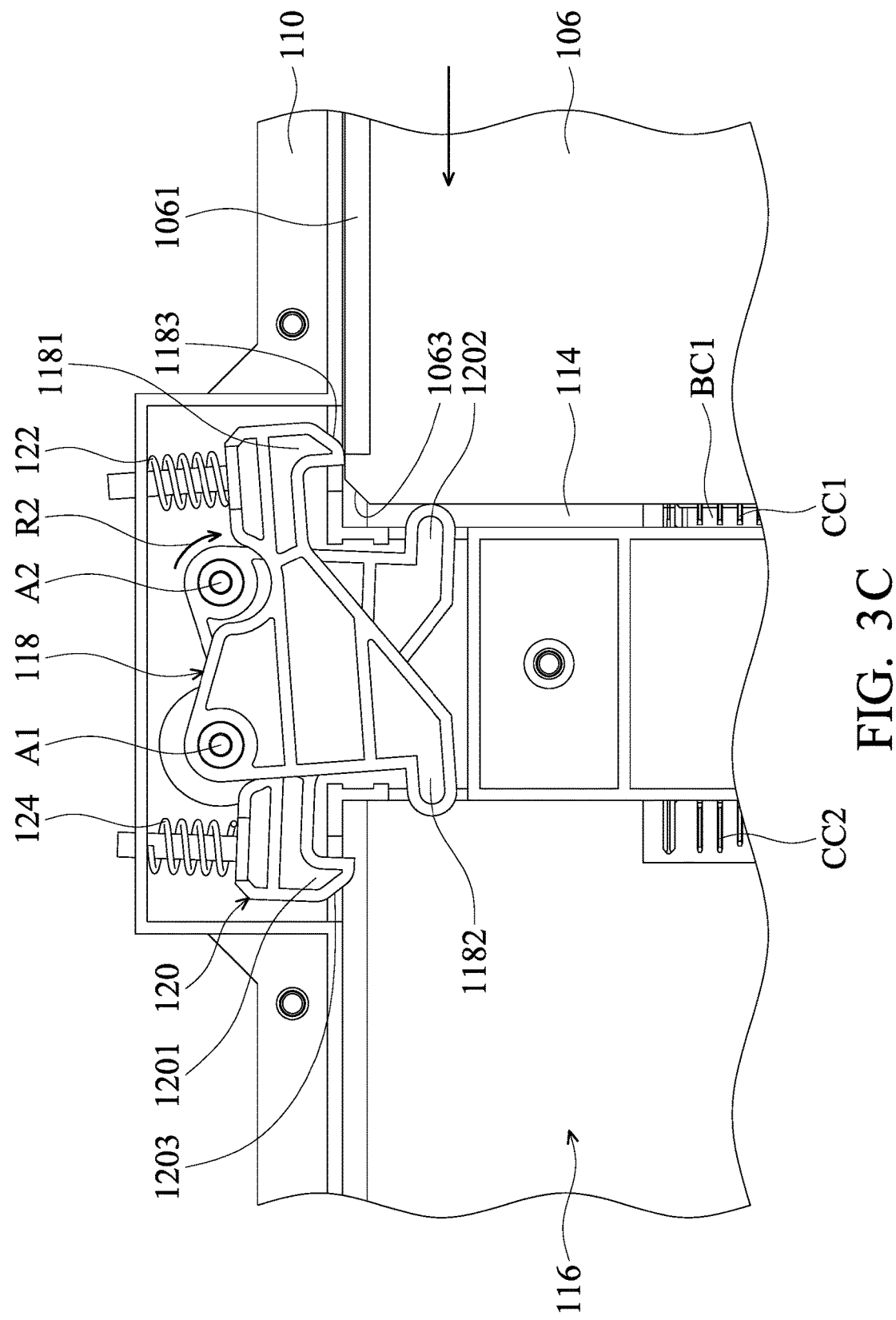
Figure 3D:
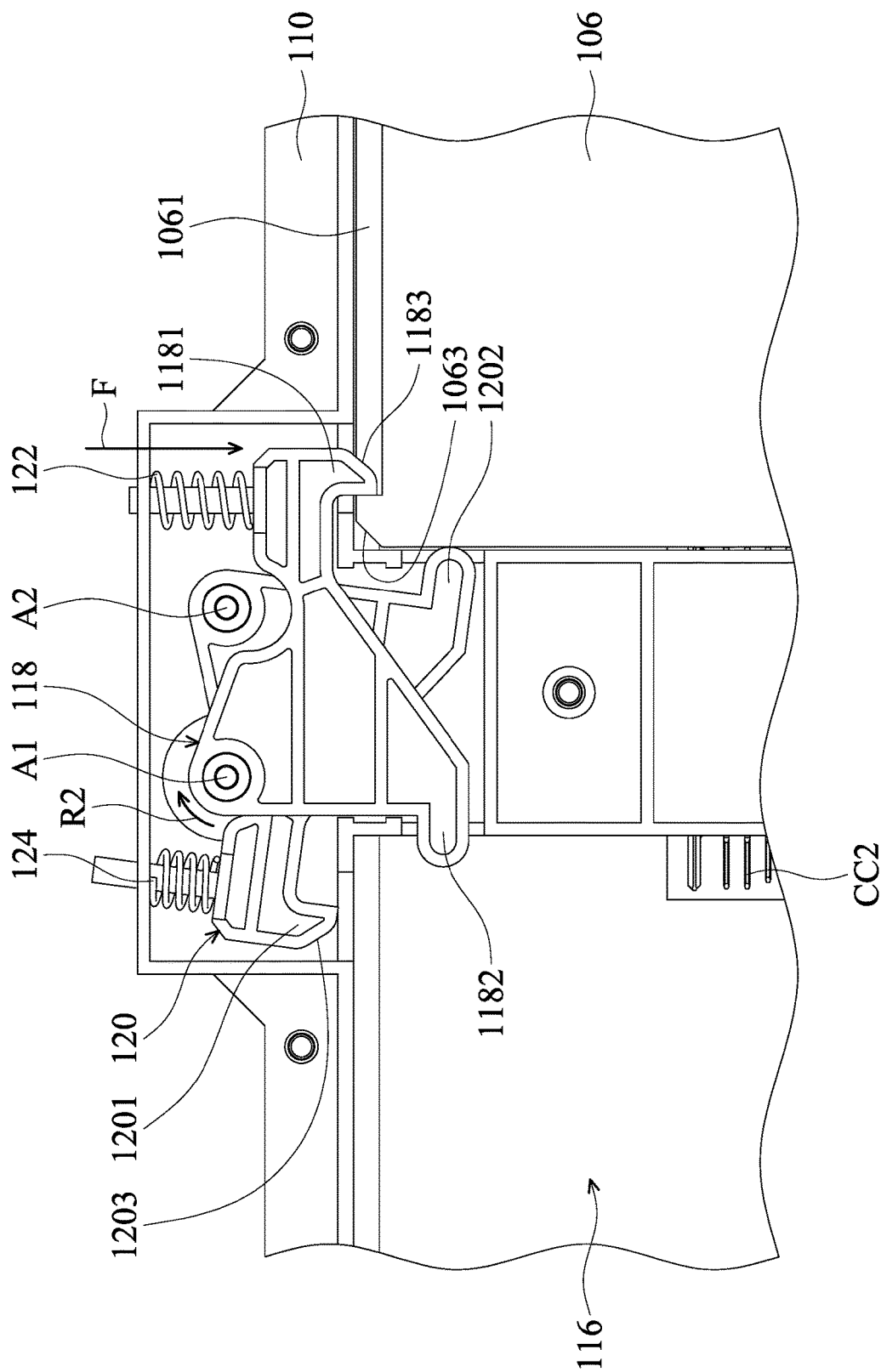

Please refer to FIG. 3A to FIG. 3D, which are diagrams illustrating the procedure of installing the first battery 106 in the first installation slot 114 according to an embodiment of the disclosure. As shown in FIG. 3A, a first inclined surface 1183 is formed on the first joining portion 1181, and the first battery 106 includes a first guiding structure 1063. At this time, the first guiding structure 1063 does not contact the first inclined surface 1183. Then, as shown in FIG. 3B, when the first battery 106 moves into the first installation slot 114 along the arrow direction in FIG. 3B, the first guiding structure 1063 contacts the first inclined surface 1183 so that the first positioning member 118 rotates around the rotating axis A1 in a first rotating direction R1, so as to force the first resilient member 122 to be deformed. In addition, a connector BC1 of the first battery 106 is connected to a first connector CC1 of the main body 110 at this time. After that, as shown in FIG. 3C, when the first battery 106 continues to move along the arrow direction in the figure, the first battery 106 contacts the second protruding portion 1202 of the second positioning member 120, so that the second positioning member 120 rotates around the rotating axis A2 in a second rotating direction R2 to a release position (the second release position) and forces the second resilient member 124. Finally, as shown in FIG. 3D, when the first battery 106 is completely accommodated in the first installation slot 114, the first resilient member 122 provides the first positioning member 118 with a resilient force F, so that the first positioning member 118 rotates along the second rotating direction R2. Then, the first joining portion 1181 is automatically joined with the first joining slot 1061, so as to fix the first battery 106. In addition, the first battery 106 is also constrained by the first constraining structure 126 when the first battery 106 is completely accommodated in the first installation slot 114 (as shown in FIG. 1). Therefore, the first battery 106 is securely constrained in the first installation slot 114 by the first constraining structure 126 and the first positioning member 118.

It should be noted that the second battery 108 includes a second guiding structure 1083, and a second inclined surface 1203 is correspondingly formed on the second joining portion 1201 (as shown in FIG. 2). When only the second battery 108 is installed in the second installation slot 116, the second guiding structure 1083 contacts the second inclined surface 1203 in the installation procedure, and the second battery 108 pushes the first protruding portion 1182, so that the first positioning member 118 rotates around the rotating axis A1. Because the procedure of installing the second battery 108 is similar to the procedure of installing the first battery 106, the description of the installation procedure of the second battery 108 is omitted herein.

Figure 4:
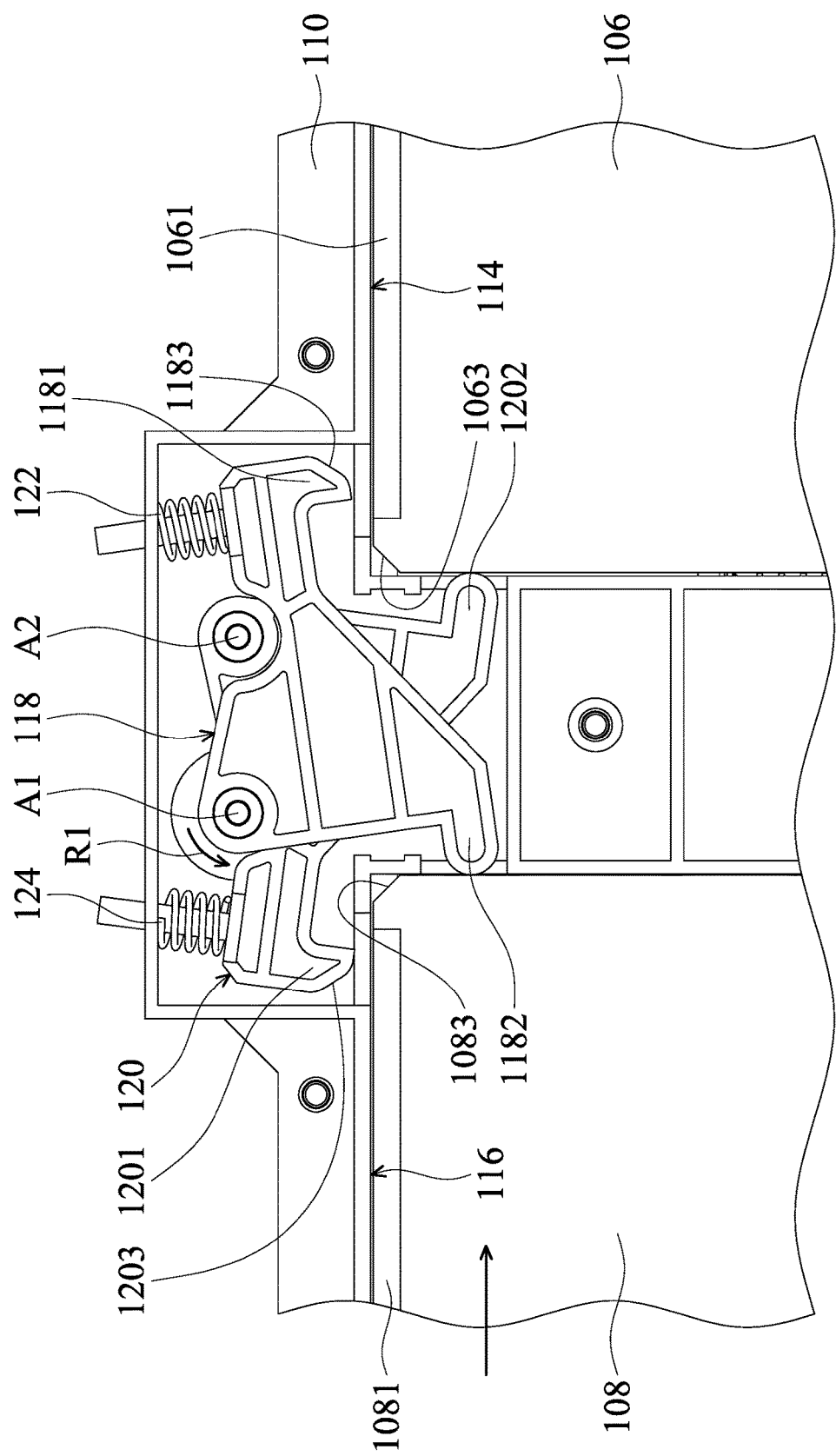
FIG. 4 is a diagram illustrating that the first battery and a second battery are respectively installed in the first installation slot and a second installation slot according to the embodiment of the disclosure.

Please refer to FIG. 4, which is a diagram illustrating that the first battery 106 and the second battery 108 are respectively installed in the first installation slot 114 and the second installation slot 116 according to the embodiment of the disclosure. Following the description of FIG. 3D, when the first battery 106 is installed in the first installation slot 114, the second positioning member 120 is located on the second release position. In this situation, when the second battery 108 is subsequently installed in the second installation slot 116, the second battery 108 only contacts the first protruding portion 1182 of the first positioning member 118, so that the first positioning member 118 rotates around the rotating axis A1 in the first rotating direction R1, so as to force the first resilient member 122 to be deformed. Finally, a connector BC2 of the second battery 108 is connected to a second connector CC2 in the portable electronic device 100. It should be noted that the first positioning member 118 is pushed to a first release position by the second battery 108 at this time, and the second battery 108 is constrained in the second installation slot 116 by the second constraining structure 128 (as shown in FIG. 1).

Figure 5A:
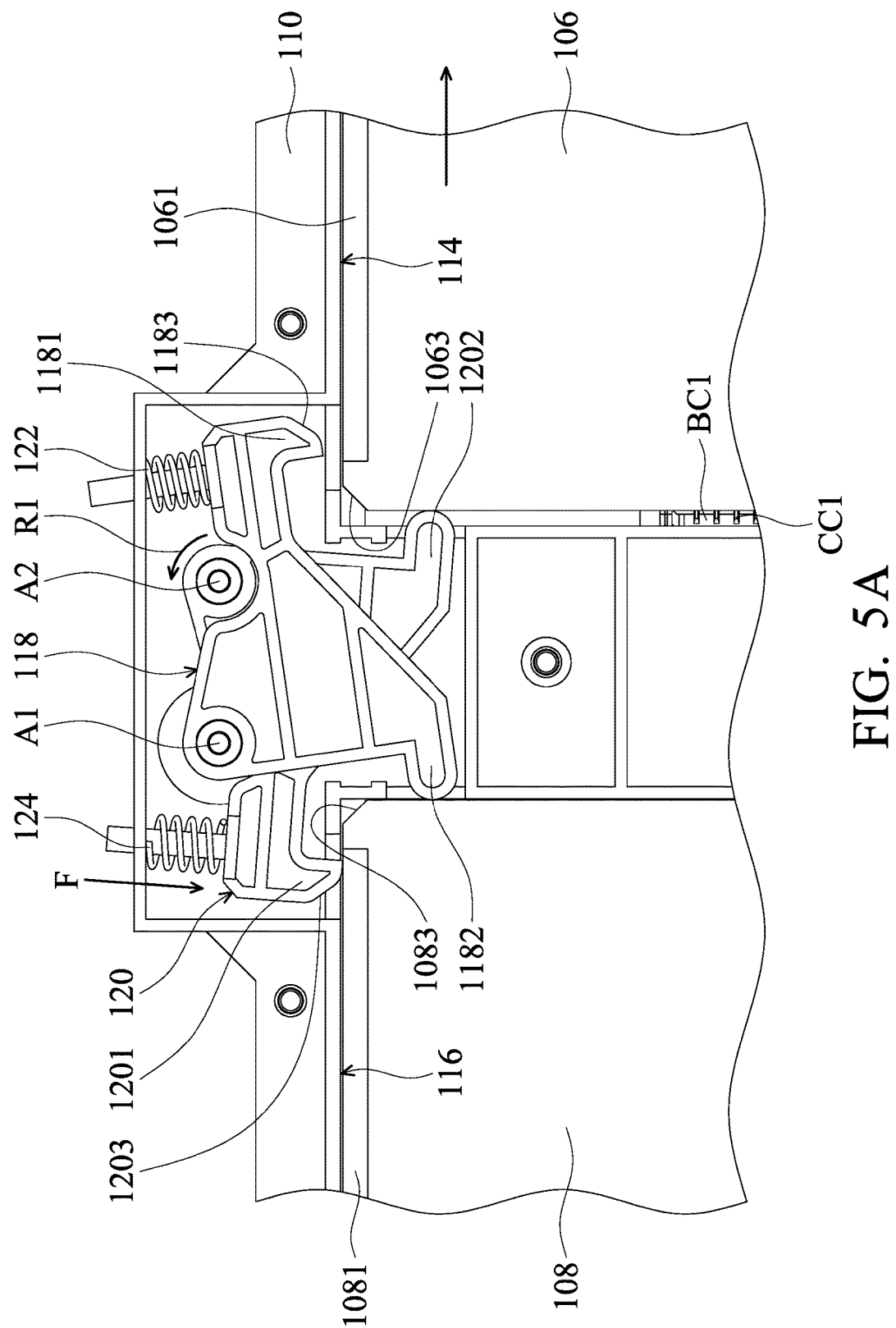
FIG. 5A and FIG. 5B are diagrams illustrating that the first battery is removed from the first installation slot according to the embodiment of the disclosure.
Figure 5B:
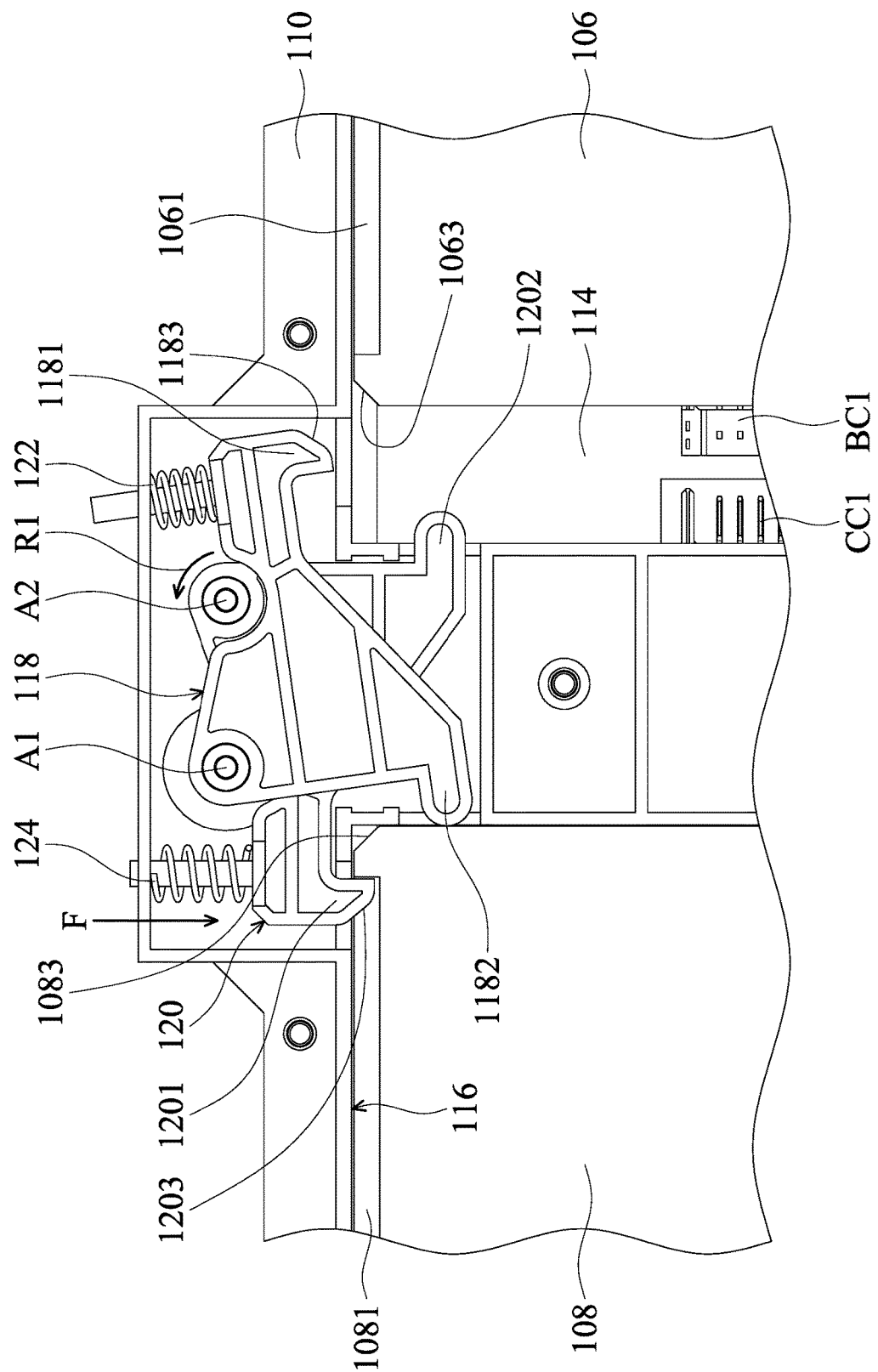

Please refer to FIG. 5A and FIG. 5B together. FIG. 5A and FIG. 5B are diagrams illustrating that the first battery 106 is removed from the first installation slot 114 according to the embodiment of the disclosure. When the user exerts a force on the first constraining structure 126 in FIG. 1 to separate from the first battery 106, the first battery 106 does not force the second protruding portion 1202 any longer, so that the second resilient member 124 provides a resilient force F to the second positioning member 120 (as shown in FIG. 5A). After that, as shown in FIG. 5B, the second positioning member 120 is driven by the resilient force F to rotate along the first rotating direction R1 from the second release position to the second initial position, so that the second protruding portion 1202 pushes the first battery 106 to move out of the main body 110. At this time, the second joining portion 1201 is joined with the second joining slot 1081 of the second battery 108, so as to constrain the second battery 108 in the second joining slot 1081 without separating from the main body 110. Therefore, even if the user subsequently exerts a force on the second constraining structure 128 in FIG. 1 to separate from the second battery 108 at this time, the second battery 108 is still not able to separate from the second installation slot 116, so as to ensure at least one battery being installed in the main body 110 to provide electricity and to prevent the occurrence of power failure.

Conversely, when the user only removes the second battery 108, the first resilient member 122 also provide a resilient force to the first positioning member 118, so that the first positioning member 118 rotates from the first release position to the first initial position to be joined with the first battery 106, so as to constrain the first battery 106 in the first installation slot 114. Therefore, the design of the joining mechanism 105 of the disclosure can prevent the user from accidentally removing the first battery 106 and the second battery 108 together, resulting in an accidental shutdown of the portable electronic device 100.

Figure 6:
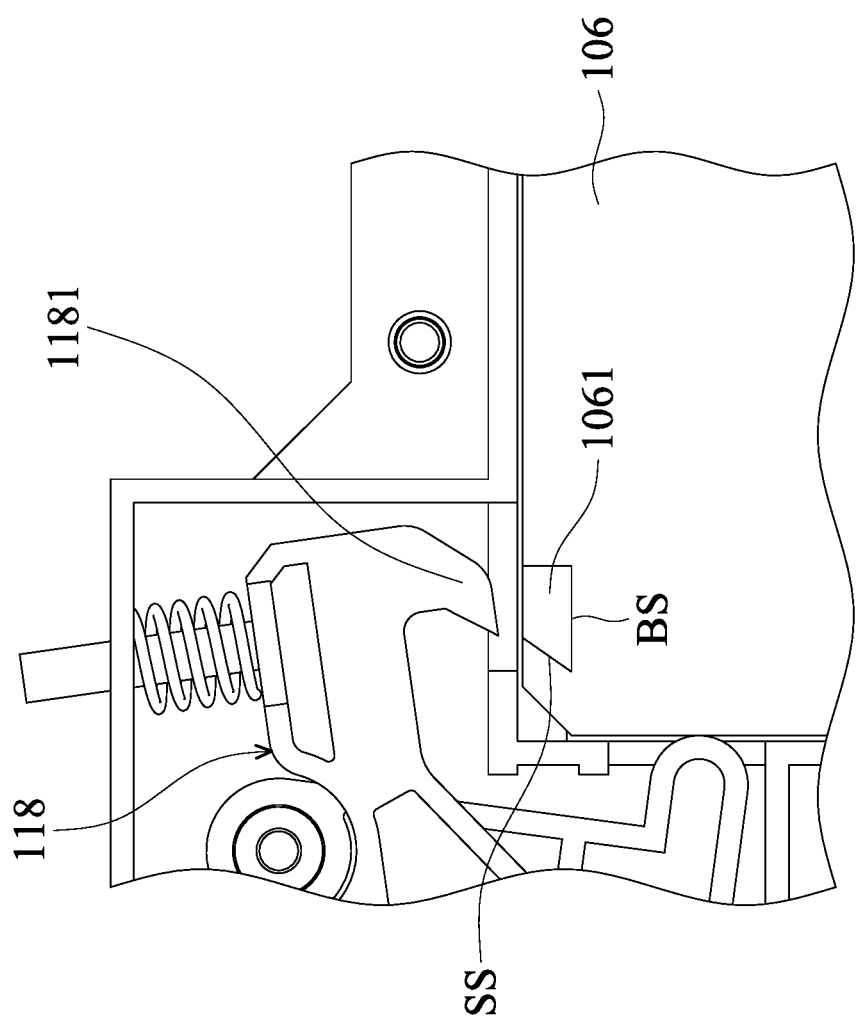
FIG. 6 is a partial diagram of the first battery and the first positioning member according to another embodiment of the disclosure.

In addition, please refer to FIG. 6, which is a partial diagram of the first battery 106 and the first positioning member 118 according to another embodiment of the disclosure. In this embodiment, the first joining slot 1061 of the first battery 106 includes an inclined surface SS and a bottom surface BS, and an acute angle is formed between the inclined surface SS and the bottom surface BS. The first joining portion 1181 of the first positioning member 118 correspondingly includes a hook structure. Based on this structural design, when the first joining portion 1181 is joined with the first joining slot 1061, the first positioning member 118 is more tightly joined with the first battery 106. Therefore, it can prevent the first battery 106 from separating from the main body 110 when the user insists on drawing the first battery 106 from the first joining slot 1061.

The disclosure provides a portable electronic device and a joining mechanism thereof. The joining mechanism can be used for fixing the first battery and the second battery. When only the first battery is removed, the second resilient member of the joining mechanism provides a resilient force to the second positioning member, so that the second positioning member rotates from the second release position to the second initial position and is joined with the second battery, so as to constrain the second battery in the second installation slot. Conversely, when only the second battery is removed, the first resilient member drives the first positioning member to be joined with the first battery, so as to constrain the first battery in the first installation slot. Therefore, based on the structural design of the joining mechanism of the disclosure, the user can only remove one of the first and second battery, so as to solve the conventional problem of the user accidentally removing two batteries together in the procedure of replacing one battery, and resulting in an accidental shutdown of the portable electronic device.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A joining mechanism, for fixing a first battery and a second battery, the joining mechanism comprising:
   a main body, comprising a first installation slot and a second installation slot for respectively receiving the first battery and the second battery; and
   a positioning assembly, comprising:
   a first positioning member, pivotally connected to the main body and being located on a first initial position;
   a second positioning member, pivotally connected to the main body and being located on a second initial position; and a first resilient member, disposed between the first positioning member and the main body;

a second resilient member, disposed between the second positioning member and the main body;

wherein the first and second batteries are configured to be separatably installed in the first and second installation slots so as to respectively push the first and second positioning members from a first initial position and a second initial position to a first release position and a second release position, so that the first resilient member and the second resilient member are forced to be deformed, and the second resilient member forces the second positioning member to rotate relative to the main body from the second release position to the second initial position and to be joined with the second battery in response to removing the first battery from the first installation slot, so as to constrain the second battery in the second installation slot.

2. The joining mechanism as claimed in claim 1, wherein the first resilient member is configured to force the first positioning member in response to removing the second battery from the second installation slot, so that the first positioning member rotates relative to the main body from the first release position to the first initial position and is joined with the first battery, so as to constrain the first battery in the first installation slot.

3. The joining mechanism as claimed in claim 1, wherein the first battery and the second battery respectively have a first joining slot and a second joining slot, the first positioning member and the second positioning member respectively have a first joining portion and a second joining portion, configured to respectively join with first joining slot and the second joining slot.

4. The joining mechanism as claimed in claim 3, wherein the first battery and the second battery respectively have a first guiding structure and a second guiding structure, and the first joining portion and the second joining portion respectively have a first inclined surface and a second inclined surface, wherein the first guiding structure contacts the first inclined surface when the first battery is installed in the first installation slot, and the second guiding structure contacts the second inclined surface when the second battery is installed in the second installation slot.

5. The joining mechanism as claimed in claim 3, wherein the first joining portion has a hook structure, the first joining slot has an inclined surface and a bottom surface, and an acute angle is formed between the inclined surface and the bottom surface.

6. The joining mechanism as claimed in claim 3, wherein the first positioning member and the second positioning member respectively have a first protruding portion and a second protruding portion, configured to respectively contact the second battery and the first battery.

7. The joining mechanism as claimed in claim 6, wherein the joining mechanism further comprises a first constraining structure and a second constraining structure configured to constrain the first battery and the second battery in the first installation slot and the second installation slot;

wherein the second resilient member is configured to drive the second positioning member to rotate from the second release position to the second initial position in response to the first constraining structure being separated from the first battery, so that the second protruding portion pushes the first battery to separate from the main body, and the second joining portion is joined with the second joining slot.

8. The joining mechanism as claimed in claim 1, wherein the joining mechanism further comprises a first guiding track and a second guiding track respectively disposed in the first installation slot and the second installation slot, and the first guiding track and the second guiding track are configured to guide the first battery and the second battery to slide into the first installation slot and the second installation slot.

9. The joining mechanism as claimed in claim 1, wherein the joining mechanism comprises two positioning assemblies disposed on opposite sides of the main body, and the first positioning member and the second positioning member of each of the positioning assemblies are symmetrically disposed on the main body relative to a central axis of the main body.

10. A portable electronic device, comprising:
a casing;
a cover, connected to the casing;
a first battery;
a second battery; and
a joining mechanism as claimed in claim 1, disposed in the casing.

11. The portable electronic device as claimed in claim 10, wherein the first resilient member is configured to force the first positioning member in response to removing the second battery from the second installation slot, so that the first positioning member rotates relative to the main body from the first release position to the first initial position and is joined with the first battery, so as to constrain the first battery in the first installation slot.

12. The portable electronic device as claimed in claim 10, wherein the first battery and the second battery respectively have a first joining slot and a second joining slot, the first positioning member and the second positioning member respectively have a first joining portion and a second joining portion, configured to respectively join with first joining slot and the second joining slot.

13. The portable electronic device as claimed in claim 12, wherein the first battery and the second battery respectively have a first guiding structure and a second guiding structure, and the first joining portion and the second joining portion respectively have a first inclined surface and a second inclined surface, wherein the first guiding structure contacts the first inclined surface when the first battery is installed in the first installation slot, and the second guiding structure contacts the second inclined surface when the second battery is installed in the second installation slot.

14. The portable electronic device as claimed in claim 12, wherein the first joining portion has a hook structure, the first joining slot has an inclined surface and a bottom surface, and an acute angle is formed between the inclined surface and the bottom surface.

15. The portable electronic device as claimed in claim 12, wherein the first positioning member and the second positioning member respectively have a first protruding portion and a second protruding portion, configured to respectively contact the second battery and the first battery.

16. The portable electronic device as claimed in claim 15, wherein the joining mechanism further comprises a first constraining structure and a second constraining structure configured to constrain the first battery and the second battery in the first installation slot and the second installation slot;

wherein when the first constraining structure is separated from the first battery, the second resilient member drives the second positioning member to rotate from the second release position to the second initial position, so that the second protruding portion pushes the first battery to separate from the main body, and the second joining portion is joined with the second joining slot.

17. The portable electronic device as claimed in claim 16, wherein the first battery and the second battery respectively have a first constraining slot and a second constraining slot, configured to be respectively joined with the first constraining structure and the second constraining structure.

18. The portable electronic device as claimed in claim 10, wherein the joining mechanism further comprises a first guiding track and a second guiding track respectively disposed in the first installation slot and the second installation slot, and the first guiding track and the second guiding track are configured to guide the first battery and the second battery to slide into the first installation slot and the second installation slot.

19. The portable electronic device as claimed in claim 10, wherein the joining mechanism comprises two positioning assemblies disposed on opposite sides of the main body.

20. The portable electronic device as claimed in claim 19, wherein the first positioning member and the second positioning member of each of the positioning assemblies are symmetrically disposed on the main body relative to the central axis of the main body.

* * * * *